Patented Mar. 18, 1941

2,235,077

UNITED STATES PATENT OFFICE 2,235,077

REFRACTORY COMPOSITION

John Charles McMullen, Niagara Falls, N. Y., assignor to The Carborundum Company, Niagara Falls, N. Y., a corporation of Delaware No Drawing. Application October 28, 1938, Serial No. 237,583

8 Claims. (Cl. 106—9)

This invention relates to improvements in refractory materials and particularly to the production of cast refractory articles possessing outstanding ability to resist sudden temperature changes. It is known that fused cast refractories are excellent for resisting slag attack, but they have had a very limited application due to their inability to stand heat shock, a factor which has made them unsatisfactory for many furnace applications.

This invention relates to magnesium oxide-aluminum oxide fusions, and particularly to basic compositions which are high in magnesium oxide content, containing over fifty percent magnesium oxide, and containing additional ingredients in lesser amounts which render them especially resistant to spalling and to other severe conditions which fused refractories may be called upon to withstand.

A common property of most cast refractories is their extremely dense structure, and absence of any extraneous bonding material, features which are largely responsible for their high resistance to corrosive slags and atmospheres. However, this dense structure has had the very serious drawback that it makes the refractory highly subject to spalling under heat shock, thus limiting the application of such cast refractories to those operations and uses of a continuous nature wherein the fluctuations in temperature are not great or frequent. This has greatly hindered the widespread use of refractories of this type and has been especially troublesome in applying the refractories to the steel and kindred industries.

I have discovered a series of basic cast refractory compositions which are highly resistant to heat shock and in addition possess the various other desirable refractory properties to a satisfactory degree. I have found that magnesia-alumina basic compositions in which the percentage of magnesia is kept high are very resistant to heat shock when there is included in the composition up to 20% of a salt of an alkali or an alkaline earth or of aluminum. These salts I shall designate as "basic" salts. I have further found that halides of these metals are especially desirable as the added ingredient in my refractory compositions. Particularly efficacious in producing these beneficial results in basic magnesia-alumina compositions is the addition of fluorspar and cryolite either alone or jointly. The amount which has been found to work most advantageously is roughly about 3%, although beneficial results can be obtained even when this percentage is varied considerably, depending upon the exact nature and constituents of the mix.

In the practice of my invention I have found several mixes which yield particularly desirable refractories, and which in cast form exhibit extremely good resistance to spalling under heat shock, and which at the same time show up well under severe temperature and corrosive slag conditions. From among these mixes, I may cite two by way of example:

| I | | II | |
|---|---|---|---|
| | Per cent | | Per cent |
| Magnesia | 67 | Magnesia | 67 |
| Alumina | 30 | Alumina | 30 |
| Fluorspar | 2 | Calcium chloride | 3 |
| Cryolite | 1 | | |

While the maximum improvement in spall resistance consistent with high refractoriness has been obtained with the mixes in proximity to the percentages given in the specific compositions above, substantial increase in the spall resistance has been obtained with compositions containing over 70% combined alumina and alkaline earth oxides included within the following range of compositions:

| | Per cent |
|---|---|
| Magnesia | 50–80 |
| Alumina | 10–45 |
| Basic salt | ½–20 |

I have furthermore found that part of the magnesia may be replaced by other basic oxides such as calcium oxide or barium oxide without detracting from the favorable results obtained. In practice it has been possible to replace as much as one fifth of the magnesium oxide with other basic oxides. For example, dolomite or other inexpensive raw materials may be incorporated to economic advantage provided the percentage of CaO thus introduced is not more than one fourth of the percentage of MgO in the mix. Examples of the mixes embodying this modification which have been found to be highly serviceable and non-spalling in character are the following:

| (1) | | (2) | |
|---|---|---|---|
| | Per cent | | Per cent |
| Magnesia | 60 | Magnesia | 43 |
| Calcium oxide | 10 | Calcium oxide | 7 |
| Alumina | 10 | Alumina | 30 |
| Fluorspar | 15 | Fluorspar | 15 |
| Cryolite | 5 | Cryolite | 5 |

It has been found desirable to extend the latitude of raw materials permissible to include more or less impure materials so as to reduce the cost. With this in mind I have found it feasible to incorporate as much as 8% of silica or other acid oxides in the batch without any appreciable detrimental effect. However, it is preferable that the acid oxide content should be low inasmuch as the presence of such materials lessens the basicity and refractoriness of the final product and lowers its resistance to basic corrosive fluxes.

Among the materials which I may utilize in conjunction with magnesia-alumina compositions to promote their resistance to spalling and which I have found to be highly applicable are cryolite, fluorspar, calcium chloride, sodium fluoride, magnesium chloride, sodium chloride, aluminum chloride, aluminum fluoride, magnesium sulphate and calcium sulphate. Generally speaking, it may be said that halide or sulphate salts of the "basic" metals are effective in bringing about the desired results. The halides of these basic metals—sodium, potassium, calcium, magnesium, barium and aluminum—have proven to be the most suitable.

While my improved composition is of particular importance in relation to cast articles, it is also capable of advantageous use when crushed and bonded (either by sintering or by the use of ceramic binders in the manner well known to the art). Refractories made of the material thus bonded are very resistant to basic slags even at high temperatures.

In the production of refractories of my improved type, fusion is carried out in a furnace similar to that commonly used for the production of fused alumina for abrasive purposes, generally consisting of a water cooled iron shell without any lining other than that built up by the material being fused as it is fed into the furnace. Fusion is effected initially by the heat from an electric arc between two or more electrodes inserted in the iron shell; but after a bath of molten material is formed, the resistance of this material to the passage of electric current through it is used to supply heat. The material is gradually fed in, and the electrodes raised as the fused mass is built up.

The furnace may be adapted either for tapping the molten material out through its side, or it may be arranged to be tilted so as to pour the material into the mold. Particularly in the latter case, it is desirable that provision be made to prevent molten material spilling into the water cooling system. This may be accomplished by the use of an iron apron properly positioned.

The molten material is heated to a temperature considerably above its melting point, and is then poured into molds which may be of granular refractory material bonded with a core binder such as is commonly used in foundry practices, or may be made of slabs of preburned refractory, of carbon, or of a suitable metal. These molds may be preheated if desired, and may be insulated to prevent too rapid loss of heat, by embedding them in a molding flask in which they are surrounded by sand or other heat insulating material.

The molds, if desired, may be provided with risers of ample size to permit complete filling of the mold without interference by material freezing in the headers. If the riser is made wedge-shaped, with its minimum section immediately adjoining the mold, removal of the excess material constituting a header is facilitated. After a mold is filled it is moved away and additional molds are also filled successively.

The molded pieces may be left in the mold for heat treatment; or, in the case of metallic molds particularly, the pieces may be taken from the molds shortly after the outer walls of the casting have solidified and then annealed without other than their own support. The headers should be removed from the castings at this point by sledging, as the castings are tougher at this stage than when cold and there is less danger of their being cracked by the hammering. With a header tapering to a smaller sectional area next the casting, removal in this manner is usually simple and fairly clean.

For annealing I may utilize any of the customary annealing practices. After the pieces are cold any objectionable remainder of the header or other minor protuberances may be removed by chipping, or in minor cases by grinding.

In the usual course of operations all of the raw materials are thoroughly premixed before the furnacing step. However, it is entirely within the scope of my invention to add any particular ingredient or any portion of ingredients at any stage of the fusing operations, or any particular ingredients may be added to the mold contents during or immediately after pouring. For instance, in the use of a small percentage of a compound which tends to volatilize at fusion temperatures, instead of incorporating it in the premixed raw batch before fusion, it may be added to the fused magma shortly before pouring, allowing time for it to be assimilated, but before material volatilization takes place.

In the specification and claims where reference is made to a basic salt or a basic halide by the term "basic" it is intended to mean a salt or a halide respectively of one of the following metals: sodium, potassium, magnesium, calcium, barium or aluminum. While aluminum is not normally considered a basic metal, because of the close similarity in action of its salts in the present process, it is included in my definition of a basic metal.

Having described and explained my invention in detail what I claim is:

1. A fused cast refractory article composed essentially of magnesium oxide and alumina and a fluoride selected from the group consisting of the fluorides of sodium, potassium, calcium, magnesium, barium and aluminum, in which article the magnesium oxide content is 50-80% and the alumina content is 10 to 45%, said article comprising ½-20% of the selected fluoride.

2. A fused cast refractory article composed essentially of magnesium oxide and alumina and an alkaline halide, in which article the magnesium oxide content is 50-80% and the alumina content is 10 to 45%, said article comprising ½-20% of an alkaline halide.

3. A fused cast refractory article composed essentially of magnesium oxide, alumina, fluorspar and cryolite, in which article the magnesium oxide content is 50-80% and the alumina content is 10 to 45%, said article comprising ½-20% of fluorspar and cryolite.

4. A fused cast refractory article composed essentially of magnesium oxide and alumina, in which article the magnesium oxide content is 50-80% and the alumina content is 10 to 45%, said article comprising ½ to 3% of a halide of a metal selected from the group consisting of sodium, potassium, calcium, magnesium, barium and aluminum.

5. A fused cast refractory article comprising 50-80% magnesium oxide, 10-45% alumina and ½-20% of a halide selected from the group consisting of the halides of sodium, potassium, calcium, magnesium, barium and aluminum.

6. A fused cast refractory article according to claim 5, in which up to one fifth of the magnesium oxide is replaced by calcium oxide.

7. A fused cast spall-resistant refractory article consisting approximately of 67% magnesia, 30% alumina, 2% fluorspar and 1% cryolite.

8. A refractory composition consisting of a fused mixture containing at least 70% of alumina plus alkaline earth oxides, and comprising 50–80% magnesium oxide, 10–45% alumina and ½–20% of a halide selected from the group consisting of the halides of sodium, potassium, calcium, magnesium, barium and aluminum.

JOHN CHARLES McMULLEN.